(12) United States Patent
Kemp et al.

(10) Patent No.: US 8,769,549 B2
(45) Date of Patent: Jul. 1, 2014

(54) GRAPHICAL PROGRAMMING SYSTEM ENABLING DATA SHARING FROM A PRODUCER TO A CONSUMER VIA A MEMORY BUFFER

(75) Inventors: J. Adam Kemp, Austin, TX (US); Neil S. Feiereisel, Cedar Park, TX (US); Brent C. Schwan, Austin, TX (US)

(73) Assignee: National Instruments Corporation, Austin, TX (US)

( * ) Notice: Subject to any disclaimer, the term of this patent is extended or adjusted under 35 U.S.C. 154(b) by 39 days.

(21) Appl. No.: 13/460,437

(22) Filed: Apr. 30, 2012

(65) Prior Publication Data

US 2013/0290980 A1  Oct. 31, 2013

(51) Int. Cl.
*G06F 3/00* (2006.01)
*G06F 13/00* (2006.01)
*G06F 9/46* (2006.01)

(52) U.S. Cl.
USPC ........... 719/312; 719/321; 711/147; 717/105; 717/109; 717/113

(58) Field of Classification Search
None
See application file for complete search history.

(56) References Cited

U.S. PATENT DOCUMENTS

| 4,914,568 | A | 4/1990 | Kodosky et al. | |
|---|---|---|---|---|
| 7,100,015 | B1 | 8/2006 | Mathiske et al. | |
| 7,549,151 | B2 | 6/2009 | Zhou et al. | |
| 8,307,136 | B2 | 11/2012 | Feiereisel et al. | |
| 8,387,005 | B1* | 2/2013 | Ghosh-Roy et al. | 717/109 |
| 2006/0036798 | A1* | 2/2006 | Dickey et al. | 711/100 |
| 2006/0041859 | A1* | 2/2006 | Vrancic et al. | 717/105 |
| 2007/0044030 | A1* | 2/2007 | Hayles | 715/762 |
| 2007/0226686 | A1* | 9/2007 | Beardslee et al. | 717/109 |
| 2008/0126956 | A1* | 5/2008 | Kodosky et al. | 715/763 |
| 2008/0307332 | A1* | 12/2008 | Hayles et al. | 715/764 |
| 2011/0078652 | A1* | 3/2011 | Mani et al. | 717/105 |

* cited by examiner

*Primary Examiner* — Charles E Anya
*Assistant Examiner* — Umut Onat
(74) *Attorney, Agent, or Firm* — Meyertons Hood Kivlin Kowert & Goetzel, P.C.; Jeffrey C. Hood

(57) ABSTRACT

A graphical program execution environment that facilitates communication between a producer program and a consumer program is disclosed. The producer program may store data in a memory block allocated by the producer program. A graphical program may communicate with the producer program to obtain a reference to the memory block. The graphical program may asynchronously pass the reference to the consumer program, e.g., may pass the reference without blocking or waiting while the consumer program accesses the data in the memory block. After the consumer program is finished accessing the data, the consumer program may asynchronously notify the graphical program execution environment to release the memory block. The graphical program execution environment may then notify the producer program that the block of memory is no longer in use so that the producer program can de-allocate or re-use the memory block.

19 Claims, 12 Drawing Sheets

GRAPHICAL PROGRAMMING SYSTEM ENABLING DATA SHARING FROM A PRODUCER TO A CONSUMER VIA A MEMORY BUFFER

FIELD OF THE INVENTION

The present invention relates to the field of graphical programming, and more particularly to a system and method for creating a graphical program and executing the graphical program in conjunction with a producer program and a consumer program, where the graphical program enables the consumer program to receive and use data produced by the producer program.

DESCRIPTION OF THE RELATED ART

Traditionally, text-based programming languages have been used by programmers in writing application programs. Many different text-based programming languages exist, including BASIC, C, C++, Visual C++, JAVA, FORTRAN, Pascal, COBOL, ADA, APL, etc. Increasingly, computers are required to be used and programmed by those who are not highly trained in computer programming techniques. When traditional text-based programming languages are used, the user's programming skills and ability to interact with the computer system often become a limiting factor in the user's efficiency of creating a computer program.

Various programming models and paradigms that enable a user to create a program in a graphical manner without necessarily writing source code in a text-based programming language have been developed. In particular, graphical programming development environments enable a user to create a software program by including a plurality of nodes or icons in a block diagram and interconnecting the nodes or icons, e.g., such that the interconnected plurality of nodes or icons visually indicates functionality of the resulting software program (called a "graphical program"). The resulting interconnected nodes may visually indicate a function or process performed by the graphical program during its execution.

SUMMARY OF THE INVENTION

Various embodiments of a system and method for creating a graphical program and/or executing the graphical program together with a producer program and a consumer program are described. The graphical program may facilitate data sharing between the producer program and the consumer program, e.g., by enabling the consumer program to use external data produced by the producer program without requiring a separate copy of the data to be made before the consumer program can access the data.

For example, the producer program may store data in a memory buffer or block allocated by the producer program. The graphical program may communicate with the producer program to obtain a reference to the memory buffer. In some embodiments this communication between the graphical program and the producer program may occur via a graphical program execution environment in which the graphical program executes. The graphical program may pass a reference to the memory block to the consumer program, which enables the consumer program to access the data in the same memory block in which the producer program stored the data. Thus, the graphical program may effectively serve as an intermediary between the producer program and the consumer program to enable the consumer program to use the data produced by the producer program without requiring the producer program and the consumer program to communicate directly with each other.

Furthermore, the consumer program may access the data asynchronously with respect to the execution of the graphical program and the execution of the producer program. For example, the graphical program may asynchronously pass the reference to the memory block to the consumer program and return without requiring the graphical program or the producer program to block or wait while the consumer program accesses the data in the memory block. After the consumer program is finished accessing the data, the consumer program may asynchronously notify the graphical program execution environment to release the memory block. The graphical program execution environment may then notify the producer program that the block of memory is no longer in use so that the producer program can de-allocate or re-use the memory block.

BRIEF DESCRIPTION OF THE DRAWINGS

A better understanding of the present invention can be obtained when the following detailed description is considered in conjunction with the following drawings, in which.

Figure 1:
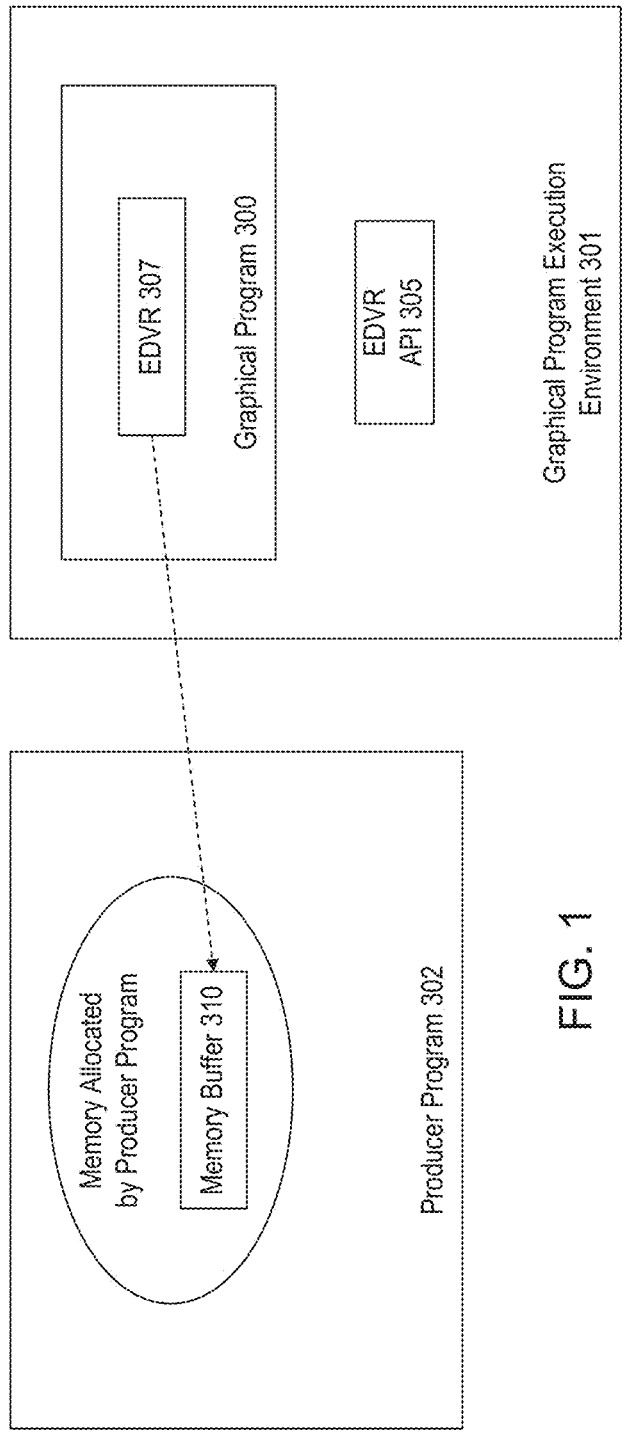
FIG. 1 illustrates an embodiment in which a producer program executes externally from a graphical program and produces data, and the graphical program acts as a consumer program that executes concurrently with the producer program to access the data.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117 titled "System and Method for Programmatically Generating a Graphical Program in Response to Program Information," filed Dec. 20, 2000.

U.S. Pat. No. 7,085,670 titled "Reconfigurable measurement system utilizing a programmable hardware element and fixed hardware resources," filed Oct. 29, 2001.

U.S. Pat. No. 8,307,136 titled "Data Movement System and Method", filed Aug. 3, 2009.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed. As used herein "data flow" or "data flow programs" refer to "dynamically-scheduled data flow" and/or "statically-defined data flow".

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Producer Program—A software program or subroutine that stores data in a memory buffer in memory of a computer system. The producer program may be the original producer of the data, or may store data in the memory buffer that was originally produced by another hardware or software entity. The producer program may be a standalone program or software application, or may be part of another program.

Consumer Program—A software program or subroutine that utilizes, accesses, or transfers data produced by another program (e.g., by a producer program) from a memory buffer. For example, the consumer program may read the data from the memory buffer and analyze or process the data. As another example, the consumer program may cause the data to be written from the memory buffer to a disk drive or other target storage location. As another example, the consumer program may cause the data to be transferred from the memory buffer to a hardware device, e.g., using DMA (direct memory access) techniques. The consumer program may be a standalone program or software application, or may be part of another program.

Various embodiments of a system and method for creating a graphical program and executing the graphical program together with a producer program and/or a consumer program are described herein. The graphical program may execute within a graphical program execution environment. The producer program and/or consumer program may execute externally from the graphical program and graphical program execution environment. The graphical program may be configured to utilize a data structure referred to herein as an external data value reference (EDVR) which enables the graphical program to natively access an external memory buffer located in a region of memory that is external to the graphical program and the graphical program execution environment. The external memory buffer may be allocated by the producer program, the consumer program, or another program such as a memory manager program.

FIG. 1 illustrates one embodiment in which a producer program 302 executes concurrently with a graphical program 300 to implement a software application. In the illustrated embodiment, the producer program 302 stores data in a memory buffer or memory block 310 which is part of a region of memory allocated by the producer program. For example, the producer program may request a region of memory from the operating system, and may then produce data and store the data in the memory buffer 310 which is located within the region of memory.

In various embodiments the producer program may produce and store any kind of data in the memory buffer 310, e.g., depending on the particular software application being performed. As one example, the producer program can be a device driver program that interfaces with a measurement device to acquire measurement data from a physical unit or system under test and store the measurement data in the memory buffer 310. In this example, the measurement device itself may actually produce the measurement data, and the device driver program may manage the measurement device and command the measurement device to transfer the measurement data into the memory buffer, e.g., using DMA (direct memory access) techniques.

In some embodiments, the graphical program 300 may act as a consumer program that reads the data produced by the producer program 302 from the memory buffer 310 and/or otherwise uses or accesses the data. The graphical program may use or access the data for any purpose, e.g., depending on the particular software application being performed. For example, the graphical program may read the data from the memory buffer 310 and write it to disk or store it in a database, may analyze the data, may modify the data, etc.

Since the memory buffer 310 is located in a region of memory allocated by an external producer program with respect to the graphical program and the graphical program execution environment, the memory buffer 310 is also referred to herein as an external memory buffer 310 (e.g., external from the point of view of the graphical program). In some embodiments the producer program 302 may execute in a different operating system process than the graphical program 300 and graphical program execution environment 301. In other embodiments, the producer program 302 may execute in the same process as the graphical program 300 and the graphical program execution environment 301, but may still be external to them. For example, the producer program 302 may be loaded from a separate binary image and/or may be installed on the computer system in a separate software installation. In some embodiments the producer program 302 may also be developed by a different software developer or vendor than the developer/vendor who created the graphical program 300.

The producer program 302 may also be written in a different programming language than the graphical program 300 and may use different kinds of internal data structures. The producer program 302 may also allocate memory from the operating system independently of memory allocations done by the graphical program 300 and graphical program execution environment 301, or may request memory blocks from a separate heap manager or other memory manager which allocates memory from the operating system independently of the memory allocations done by the graphical program 300 and graphical program execution environment 301. As a result, some conventional programming techniques would not allow a graphical program to directly access the contents of an external memory buffer allocated by the producer program, but would instead require a separate copy of the external memory buffer to be made before the data stored therein can be used by the graphical program. For example, conventional programming techniques may require the data to be copied from the external memory buffer to another memory buffer which is internal to the graphical program execution environment before the data can be used by the graphical program.

One problem with requiring a separate copy of the data to be made before it can be used by the graphical program is that copying the data can substantially decrease the performance of the application. This is especially true when the graphical program needs to use a large amount of data produced by the producer program, or needs to repeatedly use smaller blocks of data. For example, consider the application mentioned above in which the producer program is a device driver program that stores measurement data acquired by a measurement device in a memory buffer. The producer program may perform a loop in which new data sets are acquired and stored in the buffer at a high rate of speed. The graphical program may execute a loop in parallel with the producer program to read and analyze the data sets. If each data set needs to be copied into a separate buffer accessible by the graphical program then the performance of the application may suffer considerably due to the time and processing resources required for the repeated copy operations.

The system and method described herein may overcome this problem by enabling the graphical program to natively access the data stored in an external memory buffer without requiring a separate copy of the data to be made. In the example of FIG. 1, the graphical program may read the data directly from the external memory buffer 310 located in the region of memory allocated by the producer program 302. This direct access is achieved through the use of an external data value reference (EDVR) 307, which is a reference to the external memory buffer 310. The EDVR may be implemented as a data structure of which function nodes in the graphical program are aware and which the function nodes are configured to use or dereference in order to natively access the external memory buffer 310.

The graphical program 300 may include one or more reference creation nodes configured to create the EDVR 307. More particularly, when executed during the execution of the graphical program, the reference creation node(s) may communicate with the producer program 302 to cause the EDVR 307 to be created. Although the memory buffer 310 is owned or allocated by the producer program 302, the EDVR 307 that is used to reference the memory buffer 310 is a data structure that needs to be accessible by the graphical program 300. Since the producer program 302 is an external program from the graphical program 300 and the graphical program execution environment 301, the producer program 302 may not have the knowledge or ability to create the EDVR 307, which instead may need to be created internally to the graphical program execution environment 301. As illustrated in FIG. 1, the graphical program execution environment 301 may include an application programming interface (API) that includes functions for creating and managing external data value references, shown as the EDVR API 305. The producer program 302 may call the EDVR API 305 to request the EDVR data structure 307 to be created. In response to this request, the graphical program execution environment 301 may create the EDVR 307 and return it to the producer program 302.

When the producer program 302 receives the EDVR 307 from the graphical program execution environment 301, the producer program 302 may modify the EDVR 307 to cause the EDVR 307 to reference the memory buffer 310, e.g., by writing memory location information into the EDVR 307 indicating where the memory buffer 310 is stored in memory.

The producer program 302 may then return the EDVR 307 to the graphical program 300. The reference creation node in the graphical program 300 which initiated the creation of the EDVR 307 may receive the EDVR 307 from the producer program 302 and pass the EDVR 307 to one or more other nodes in the graphical program 300. These one or more other nodes may receive the EDVR 307 and use it to natively access the data stored in the external memory buffer 310, e.g., by reading the data directly from the memory locations where the data was originally stored by the producer program 302. In this way, the graphical program is enabled to act as a consumer program that natively accesses data produced and stored in memory by an external producer program without requiring a separate copy of the data to be made.

After the graphical program has read or otherwise used the data from the external memory buffer 310, the graphical program may release the EDVR 307 that references the external memory buffer 310. Releasing the EDVR 307 may notify the producer program 302 that the EDVR 307 is no longer in use by the graphical program. The producer program 302 may then de-allocate or re-use the memory buffer 310 that was referenced by the EDVR 307. In some embodiments the graphical program may communicate directly with the producer program 302 to release the EDVR 307. In other embodiments the graphical program may call the EDVR API 305 of the graphical program execution environment to release the EDVR 307, and the graphical program execution environment may in turn communicate with the producer program 302.

Figure 2:
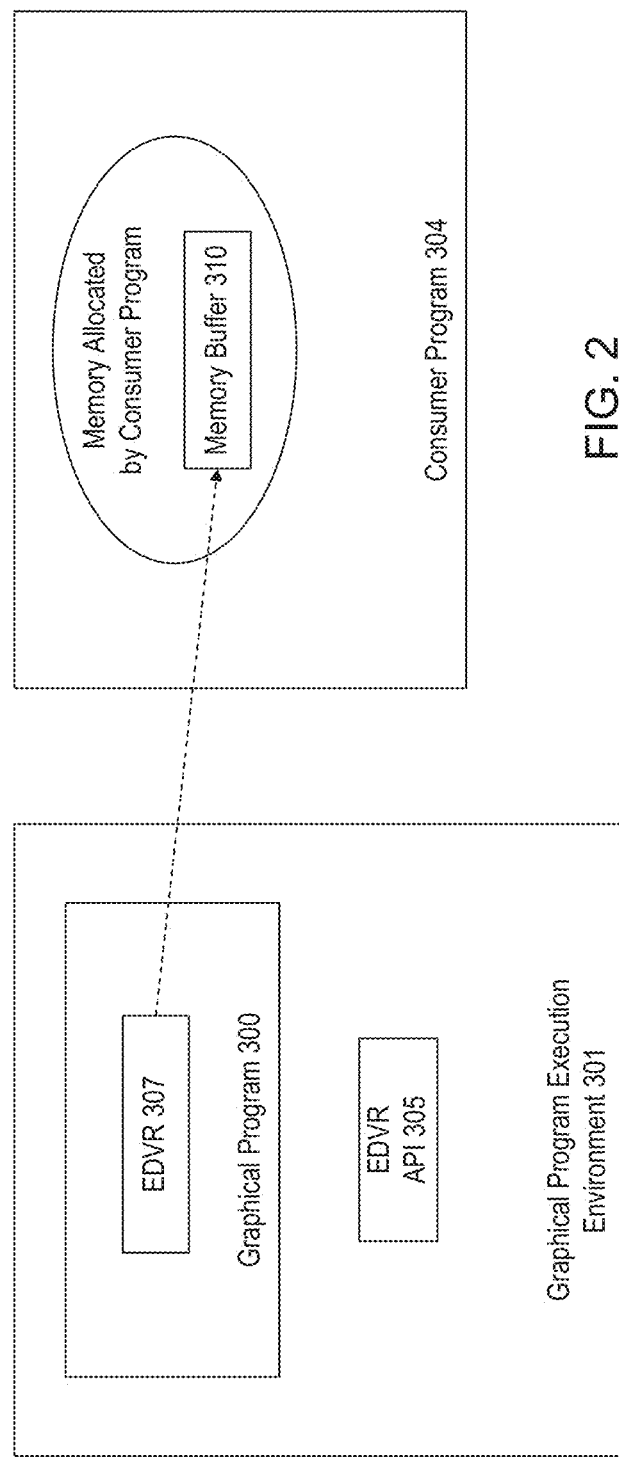
FIG. 2 illustrates an embodiment in which a graphical program acts as a producer program that produces data and executes concurrently with an external consumer program that accesses the data.

In another embodiment, a graphical program 300 may act as a producer program that stores data and executes concurrently with an external consumer program 304 which accesses the data, as illustrated in FIG. 2. The consumer program 304 may execute externally from the graphical program 300 and graphical program execution environment 301. In some embodiments the consumer program 304 may also be written in a different programming language than the graphical program 300. The consumer program 304 may also allocate memory from the operating system independently of memory allocations done by the graphical program 300 and graphical program execution environment 301, or may request memory blocks from a separate heap manager or other memory manager which allocates memory from the operating system independently of the memory allocations done by the graphical program 300 and graphical program execution environment 301.

The graphical program 300 may create an EDVR 307 to reference an external memory buffer 310 which is located within a region of memory allocated by the consumer program 304, e.g., in order to store the data in the external memory buffer 310. The consumer program 304 may then access the external memory buffer 310 for various purposes. The use of the EDVR 307 may enable the graphical program 300 to natively access the external memory buffer 310 in order to write the data directly into the external memory buffer 310 allocated by the consumer program.

The graphical program 300 may include one or more reference creation nodes configured to create the EDVR 307. More particularly, when executed during the execution of the graphical program, the reference creation node(s) may communicate with the consumer program 304 to cause the EDVR 307 to be created. The consumer program 304 may call the EDVR API 305 of the graphical program execution environment 301 to request the EDVR data structure 307 to be created. In response to this request, the graphical program execution environment 301 may create the EDVR 307 and return it to the consumer program 304. When the consumer program 304 receives the EDVR 307 from the graphical program execution environment 301, the consumer program 304 may modify the EDVR 307 to cause the EDVR 307 to reference the memory buffer 310, e.g., by writing memory location information into the EDVR 307 indicating where the memory buffer 310 is stored in memory.

The consumer program 304 may then return the EDVR 307 to the graphical program 300. The reference creation node in the graphical program 300 which initiated the creation of the EDVR 307 may receive the EDVR 307 from the consumer program 304 and pass the EDVR 307 to one or more other nodes in the graphical program 300. These one or more other nodes may receive the EDVR 307 and dereference it in order to write data directly into the external memory buffer 310.

After the graphical program has written the data into the external memory buffer 310, the graphical program may release the EDVR 307 that references the external memory buffer 310. Releasing the EDVR 307 may notify the consumer program 302 that the graphical program has finished using the EDVR 307. This may inform the consumer program that the memory buffer 310 now contains the data written by the graphical program. The consumer program may then access the memory buffer 310 to use the data for various purposes, e.g., by writing the data to disk, performing commands specified by the data, etc.

The graphical program 300 may be created by a user who interacts with a graphical program development environment to include various function nodes in a block diagram of the graphical program and wire them together so that the interconnected nodes visually indicate functionality of the graphical program. Each function node provided by the graphical program development environment may perform a specific function or operation when it is executed during the execution of the graphical program.

In some conventional graphical programming systems, some function nodes are configured to read data from or write data to internal memory buffers (e.g., memory buffers created by the graphical program and located within a region of memory allocated by the graphical program), but are generally not able to read data from or write data to external memory buffers. Embodiments of the present system and method may extend the memory access capabilities of a graphical programming system so that the function nodes provided by the graphical programming system can natively access external memory buffers as well as internal memory buffers.

A user may configure a function node to access an internal memory buffer by configuring the function node to receive a data structure that references the internal memory buffer. According to some embodiments of the present system and method, a function node which can receive a reference to an internal memory buffer may also be configured to receive an EDVR data structure that references an external memory buffer. Thus, a given function node may be configured to operate on either an internal memory buffer or an external memory buffer, depending on what kind of reference is passed to the function node. Thus, embodiments of the present system and method provide native access to external memory buffers because, through the use of an EDVR data structure, the function nodes used in the graphical program can read data from and write data to an external memory buffer as if the external memory buffer were an internal memory buffer allocated by the graphical program itself. This native access to external memory buffers may be built in to the graphical program development environment so that the nodes which can receive references to and access internal memory buffers are in general also configured to be able to receive EDVRs and access external memory buffers.

From the standpoint of the user who creates the graphical program, configuring the graphical program to access an external memory buffer may be as simple as configuring the graphical program to access an internal memory buffer. For example, the user may simply include in the graphical program a particular function node that is executable to perform an operation that involves reading data from memory or writing data to memory. The user may then configure the function node to receive an EDVR that references the desired external memory buffer. The graphical program may then be executed. During the execution of the graphical program, the function node may receive the EDVR and read data from or write data to the external memory buffer.

Figure 3:
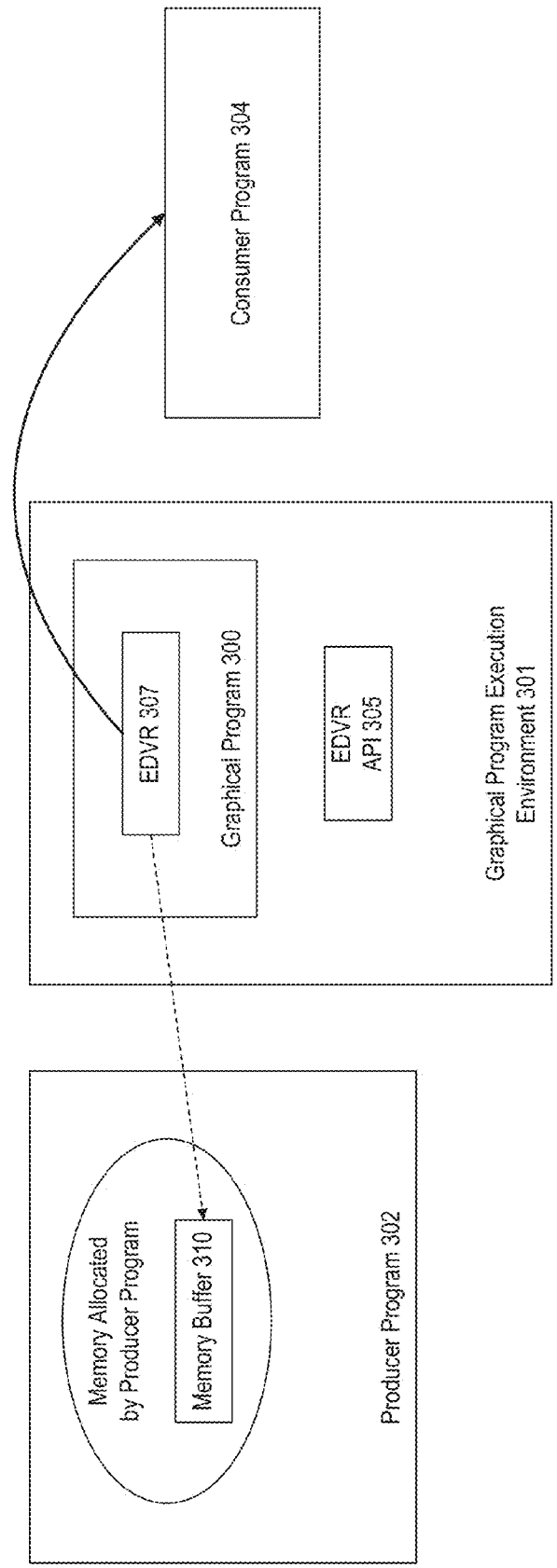
FIG. 3 illustrates an embodiment in which a graphical program executes concurrently with both a producer program and a consumer program.

FIG. 3 illustrates another embodiment where the graphical program 300 executes concurrently with both a producer program 302 and a consumer program 304. In the illustrated embodiment, a memory buffer 310 is located within a region of memory allocated by the producer program 302. The producer program may store data in the memory buffer 310. The graphical program 300 may be configured to create the EDVR 307 that references the external memory buffer 310, similarly as described above. The graphical program 300 may possibly include one or more function nodes that receive the EDVR 307 and use the EDVR 307 to access the memory buffer 310. As one example, the graphical program may read the data produced by the producer program from the memory buffer 310, analyze the data, modify the data based on the analysis, and replace the original data in the memory buffer 310 with the modified data. The graphical program may then pass the EDVR 307 to the consumer program 304. The consumer program may receive the EDVR 307 and use the EDVR 307 to access the memory buffer 310. As one example, the consumer program may cause the data to be written from the memory buffer 310 to disk, may store the data in a database, may analyze the data, may send the data over a network, may transfer the data to a hardware device, or may perform any of various other operations that use the data. The EDVR 307 enables the consumer program 304 to access the data directly from the memory buffer 310 without requiring the data in the memory buffer 310 to first be copied to another memory buffer.

In other embodiments the graphical program 300 may read the data from the memory buffer 310 and use the data in various ways, but may not modify the contents of the memory buffer 310. Thus, the consumer program may access the original data stored by the producer program.

In yet other embodiments, the graphical program may not read the data from or write any data to the memory buffer 310. Instead, the graphical program may just create the EDVR 307 and pass it to the consumer program which then uses the EDVR 307 to access the data in the memory buffer 310.

It is noted that in the software architecture illustrated in FIG. 3, the graphical program 300 effectively serves as an intermediary between the producer program 302 and the consumer program 304 to enable the use of the producer program's data by the consumer program without requiring the producer program and the consumer program to communicate directly with each other or even to have any knowledge at all of each other.

In some embodiments the consumer program may be configured to call the EDVR API of the graphical program execution environment to release the EDVR when it is finished using the EDVR. In response, the graphical program execution environment may in turn notify the producer program that the EDVR has been released by the consumer program so that the producer program can then de-allocate or re-use the memory buffer referenced by the EDVR.

In some embodiments the release of the EDVR may occur asynchronously with respect to the execution of the graphical program. For example, the graphical program may pass the EDVR to the consumer program and then continue its execution without blocking or waiting for the consumer program to finish using the EDVR. When the consumer is finished using the EDVR, the consumer program may asynchronously call the EDVR API of the graphical program execution environment to release the EDVR.

Thus, the consumer program may be able to execute asynchronously with respect to the execution of the graphical program and the execution of the producer program. For example, the producer program may execute a loop. In each iteration of the producer program's loop, the producer program may generate a new data set and store it in a respective memory buffer. The graphical program may execute to create EDVRs that reference these memory buffers and may pass the EDVRs to the consumer program. The consumer program may also execute a loop. In each iteration of the consumer program loop, the consumer program may receive a reference to a respective memory buffer and stream the data set to disk (or use the data set in various other ways). The graphical program may pass the EDVRs to the consumer program without requiring the graphical program or the producer program to block or wait while the consumer program streams each data set to disk. The consumer program may asynchronously notify the graphical program execution environment when it is finished using each EDVR, and the graphical program execution environment may then notify the producer program that the EDVR has been released so that the memory buffer it references can be de-allocated or re-used by the producer program.

In other embodiments the consumer program may not call the EDVR API of the graphical program execution environment to release the EDVR, but may instead communicate with the graphical program to notify the graphical program that it is finished using the EDVR, e.g., by invoking a node of the graphical program. The graphical program may then immediately invoke the EDVR API of the graphical program execution environment to release the EDVR, or may perform further processing with the EDVR. For example, when the first consumer program notifies the graphical program that it is finished using the EDVR, the graphical program may then pass the EDVR to a second consumer program. The second consumer program may in turn access the memory buffer using the EDVR, and may then either invoke the EDVR API to release the EDVR or notify the graphical program that it is finished using the EDVR.

In applications that use multiple consumer programs, the consumer programs may execute either serially or concurrently. As an example of an application in which multiple consumer programs operate serially, suppose that the producer program is a device driver program that communicates with a first hardware device to command the first hardware device to transfer data into a memory buffer using a DMA technique. The graphical program may create an EDVR referencing the memory buffer and pass the EDVR to a first consumer program. The first consumer program may read the data from the memory buffer, produce modified data, and replace the original data in the memory buffer with the modified data. The first consumer program may then notify the graphical program that it is finished using the EDVR. In response, the graphical program may pass the EDVR to a second consumer program that modifies the data in the memory buffer again, similarly as the first consumer program did. The second consumer program may then notify the graphical program that it is finished using the EDVR. In response, the graphical program may pass the EDVR to a third consumer program. The third consumer program may be a device driver program for a second hardware device, and may cause the data to be transferred from the memory buffer to the second hardware device using a DMA technique. The third consumer program may then either call the EDVR API of the graphical program execution environment to release the EDVR, or notify the graphical program that it is finished using the EDVR. In the latter case, the graphical program may possibly use the EDVR to access the memory buffer, and may call the EDVR API to release the EDVR when it is finished using the EDVR.

If multiple consumer programs concurrently access the memory buffer concurrently, the consumer programs may need to indicate that their access to the memory buffer will be read-only so that the consumer programs have no effect on the data in the memory buffer or on the operation of each other.

In the embodiment illustrated in FIG. 3, the external memory buffer 310 is allocated by the producer program 302. In other embodiments the external memory buffer 310 may be allocated by the consumer program 304. For example, the graphical program 300 may create an EDVR 307 that references the external memory buffer allocated by the consumer program. The graphical program may then pass the EDVR 307 to the producer program, and the producer program may use the EDVR to write data into the memory buffer 310. The consumer program may then access the memory buffer 310 to use the data to perform various functions.

In other embodiments the external memory buffer 310 may be allocated by another program, such as a memory manager program, that is external to the producer program 302, the consumer program 304, and the graphical program 300. An external memory manager program may also be used to allocate the memory buffer 310 in embodiments where the graphical program 300 executes together with a producer program without the use of a separate consumer program (similarly as in FIG. 1), and in embodiments where the graphical program 300 executes together with a consumer program without the use of a separate producer program (similarly as in FIG. 2).

Figure 4:
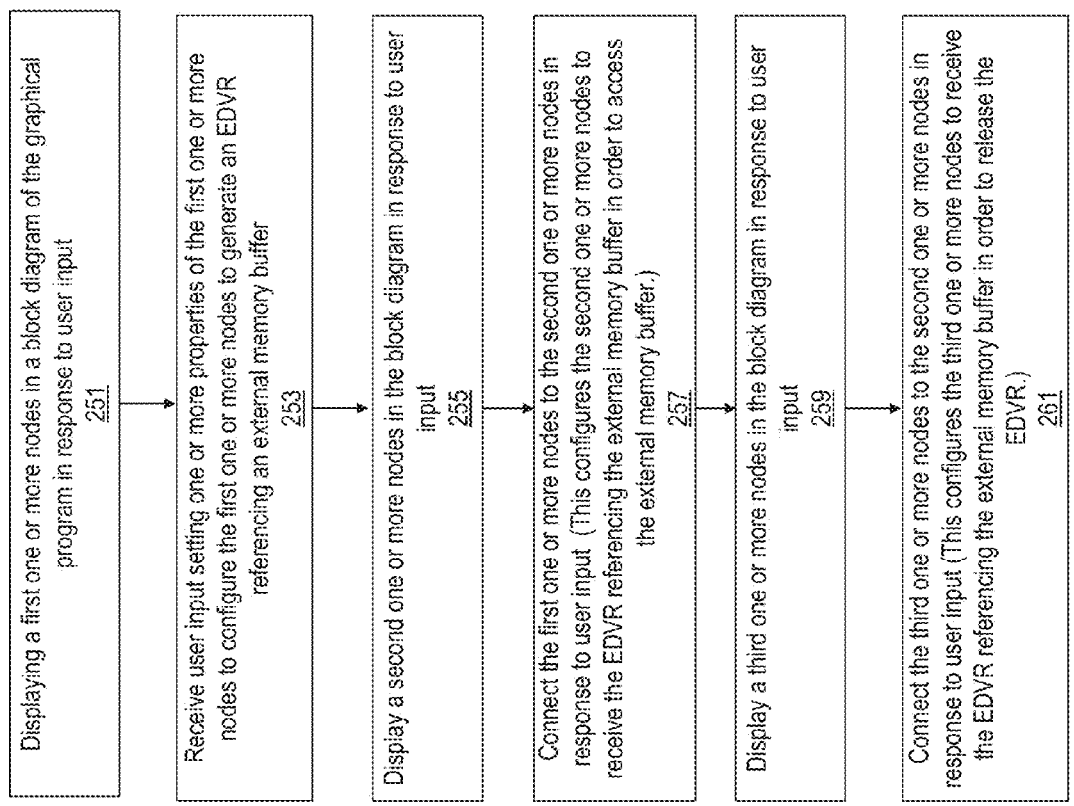
FIG. 4 is a flowchart diagram illustrating one embodiment of a method for creating a graphical program in response to user input, where the graphical program is configured to natively access an external memory buffer.

As mentioned above, the graphical program 300 may be created by a user who interacts with a graphical program development environment to include various function nodes in a block diagram of the graphical program and wire them together so that the interconnected nodes visually indicate functionality of the graphical program. For example, the graphical program development environment may provide a graphical user interface which includes palettes or menus enabling the user to selecting particular nodes for inclusion in the graphical program. FIG. 4 is a flowchart diagram illustrating one embodiment of a method for creating the graphical program in response to user input. The method may be implemented by the graphical program development environment software executing on a computer system.

As indicated in block 251, a first one or more nodes may be displayed in a block diagram of the graphical program in response to user input. For example, the user may drag and drop the first one or more nodes from a palette into the block diagram, or may select the first one or more nodes from a menu. The first one or more nodes may be executable to create an EDVR data structure referencing an external memory buffer, and thus are also referred to herein as a reference creation node(s). As indicated in block 253, in some embodiments the graphical program development environment may receive user input setting one or more properties of the first one or more nodes to configure the first one or more nodes to generate the EDVR. The one or more properties may specify information about the EDVR to be generated and/or about the external memory buffer referenced by the EDVR. In some embodiments the first one or more nodes may call another program, such as the producer program, consumer program, or a memory manager program, in order to generate the EDVR. The other program may interact with the graphical program execution environment via the EDVR API to create the EDVR. The one or more properties may specify which program the first one or more nodes should call in order to generate the EDVR. In alternative embodiments the first one or more nodes may be inherently configured with information specifying the properties of the EDVR to be generated, and no user input setting these properties may be required.

As indicated in block 255, a second one or more nodes may also be displayed in the block diagram in response to user input. The second one or more nodes may be function nodes configured to perform any of various functions or algorithms that operate to access the external memory buffer referenced by the EDVR. As indicated in block 257, the graphical program development environment may connect the first one or more nodes to the second one or more nodes in response to user input. For example, the user may use a wiring tool provided by the graphical program development environment to wire together an output terminal of one of the first one or more nodes to an input terminal of one of the second one or more nodes. This may configure the second one or more nodes to receive the EDVR referencing the external memory buffer during the execution of the graphical program. The second one or more nodes may then execute to perform the particular function or algorithm they implement. In performing this function or algorithm, the second one or more nodes may use the EDVR to natively access the external memory buffer, e.g., to read data from or write data to the external memory buffer.

As indicated in block 259, a third one or more nodes may also be displayed in the block diagram in response to user input. The third one or more nodes may be executable to release the EDVR data structure, and thus are also referred to herein as a reference release node(s). As indicated in block 261, the graphical program development environment may connect the third one or more nodes to the second one or more nodes in response to user input. This may configure the third one or more nodes to receive the EDVR during the execution of the graphical program. The third one or more nodes may then execute to release the EDVR, e.g., so that the external memory buffer it references can be de-allocated or re-used by the owner program.

Figure 5:
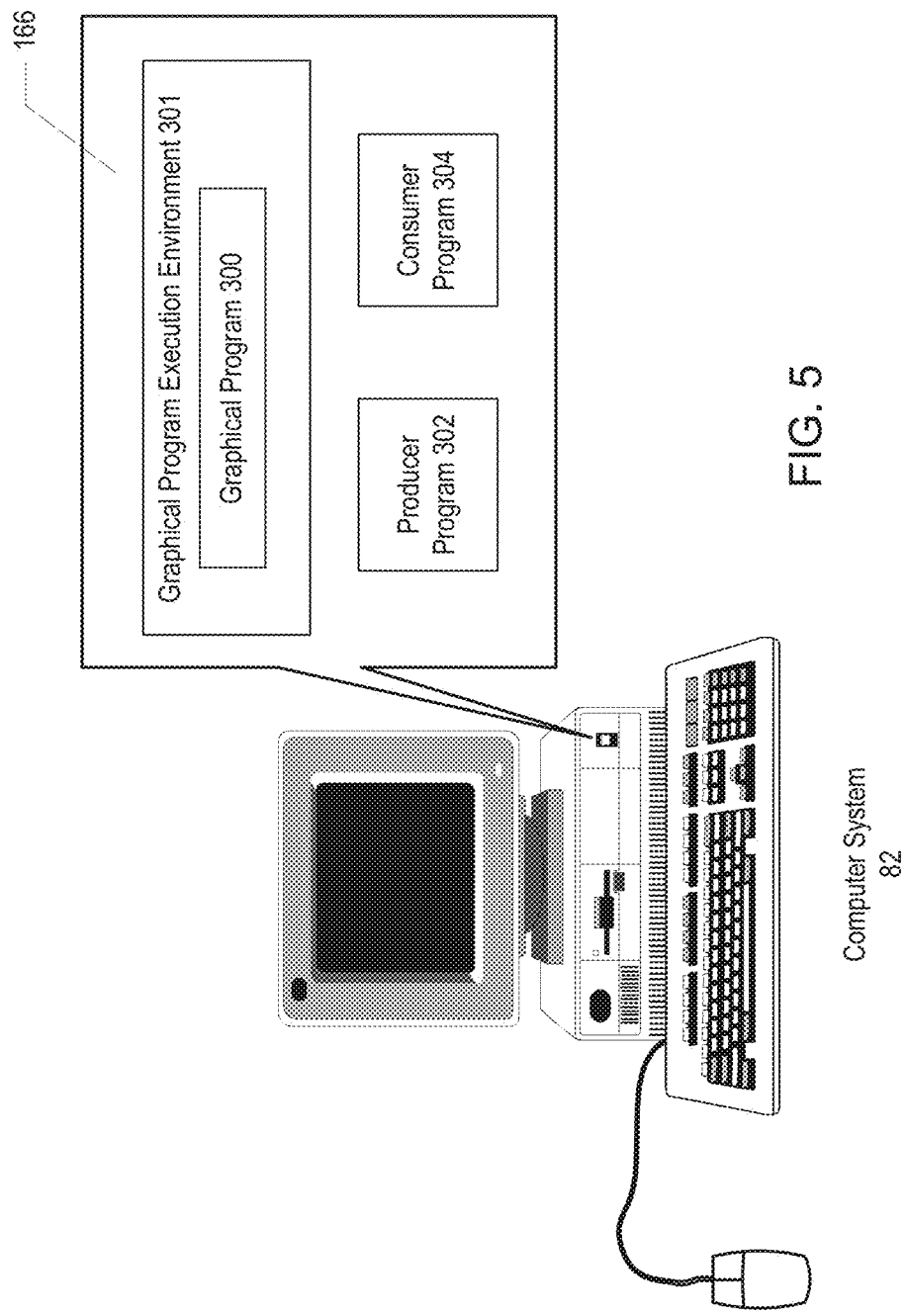
FIG. 5 illustrates a computer system configured to execute a graphical program in conjunction with a producer program and a consumer program.

FIG. 5—Computer System

FIG. 5 illustrates a computer system 82 configured to execute software to implement embodiments of the methods described herein. For example, the computer system 82 may include memory 166 that stores the graphical program execution environment 301 and the graphical program 300 that executes in the graphical program execution environment 301. In some embodiments the memory 166 may also store the graphical program development environment that is used to create the graphical program 300. In other embodiments the graphical program 300 may be developed on a separate development computer system and then deployed on the computer system 82. The memory 166 may also store a producer program 302 and/or a consumer program 304.

In some embodiments a graphical user interface or front panel of the graphical program may also be displayed on the display device during execution of the graphical program. The graphical user interface may comprise any type of graphical user interface, e.g., depending on the computing platform.

Figure 6:
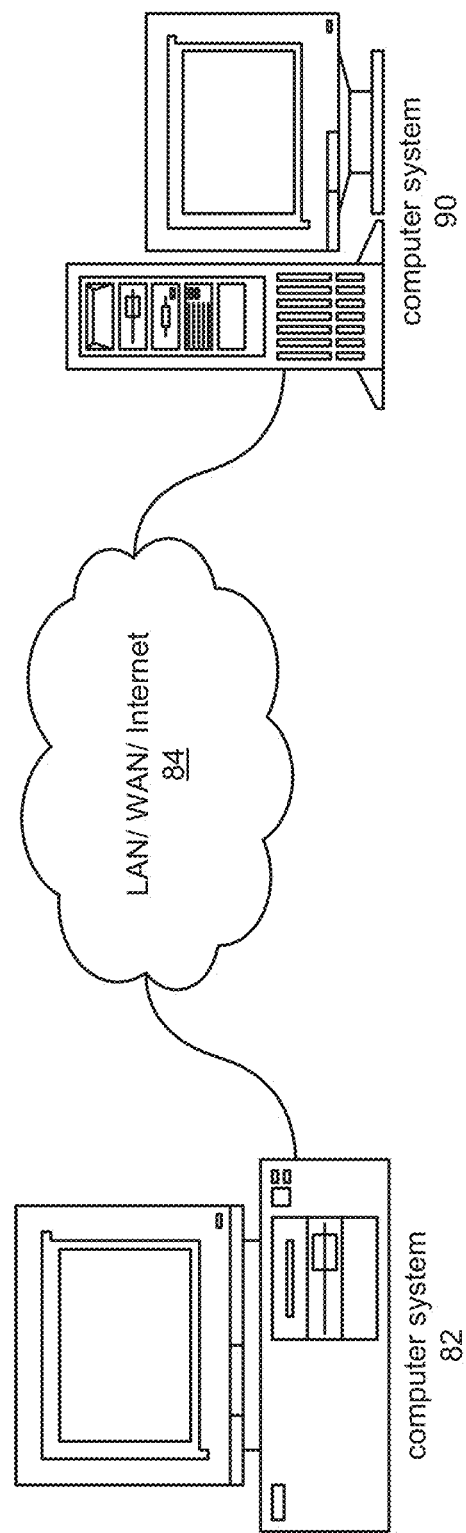
FIG. 6 illustrates a system in which the computer system is coupled to a second computer system.

FIG. 6—Computer Network

FIG. 6 illustrates a system in which the computer system 82 is coupled to a second computer system 90. The computer system 82 may be coupled via a network 84 or a communication bus to the second computer system 90. The computer systems 82 and 90 may each be any of various types. The network 84 can also be any of various types, including a LAN (local area network), WAN (wide area network), the Internet, or an Intranet, among others. In some embodiments the computer systems 82 and 90 may execute the graphical program 300, the producer program 302, and/or the consumer program 304 in a distributed fashion. For example, the computer 82 may execute a first portion of the graphical program 300, and the computer system 90 may execute a second portion of the graphical program 300. As another example, the computer 82 may display the graphical user interface of the graphical program 300, and the computer system 90 may execute the block diagram of the graphical program 300. As another example, the producer program 302 may execute on the computer system 90, and the graphical program 300 and consumer program 304 may execute on the computer system 82, or the various programs may be distributed across the computer systems 82 and 90 (and possibly other computer systems) in other ways.

Exemplary Systems

In various embodiments the graphical program 300 may execute in conjunction with the producer program 302 and/or the consumer program 304 to perform any kind of application. Examples of applications they may implement include: performing test and/or measurement functions; controlling and/or modeling instrumentation or industrial automation hardware; modeling and simulation functions, e.g., modeling or simulating a device or product being developed or tested, etc. However, it is noted that embodiments of the present invention can be used for a plethora of applications and is not limited to the above applications. In other words, applications discussed in the present description are examples only, and embodiments of the present invention may be used in any of various types of systems. Thus, embodiments of the system and method of the present invention may be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 7:
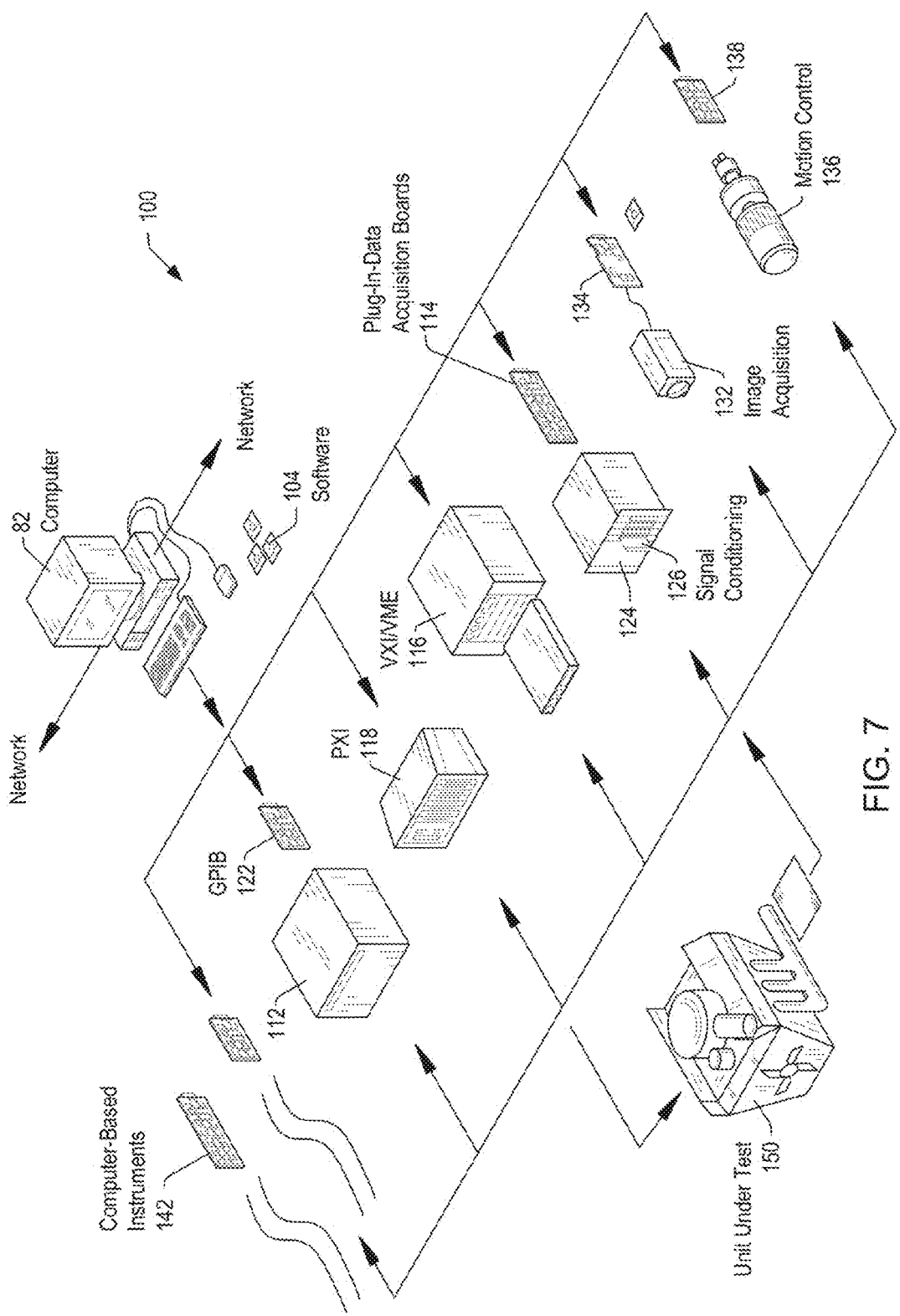
FIG. 7 illustrates an exemplary instrumentation control system.

FIG. 7 illustrates an exemplary instrumentation control system 100 which may implement embodiments of the invention. The system 100 comprises a host computer 82 which couples to one or more instruments. The host computer 82 may include a CPU, a display screen, memory, and one or more input devices such as a mouse or keyboard as shown. The computer 82 may operate with the one or more instruments to analyze, measure or control a unit under test (UUT) or process 150, e.g., via execution of software 104.

Figure 8:
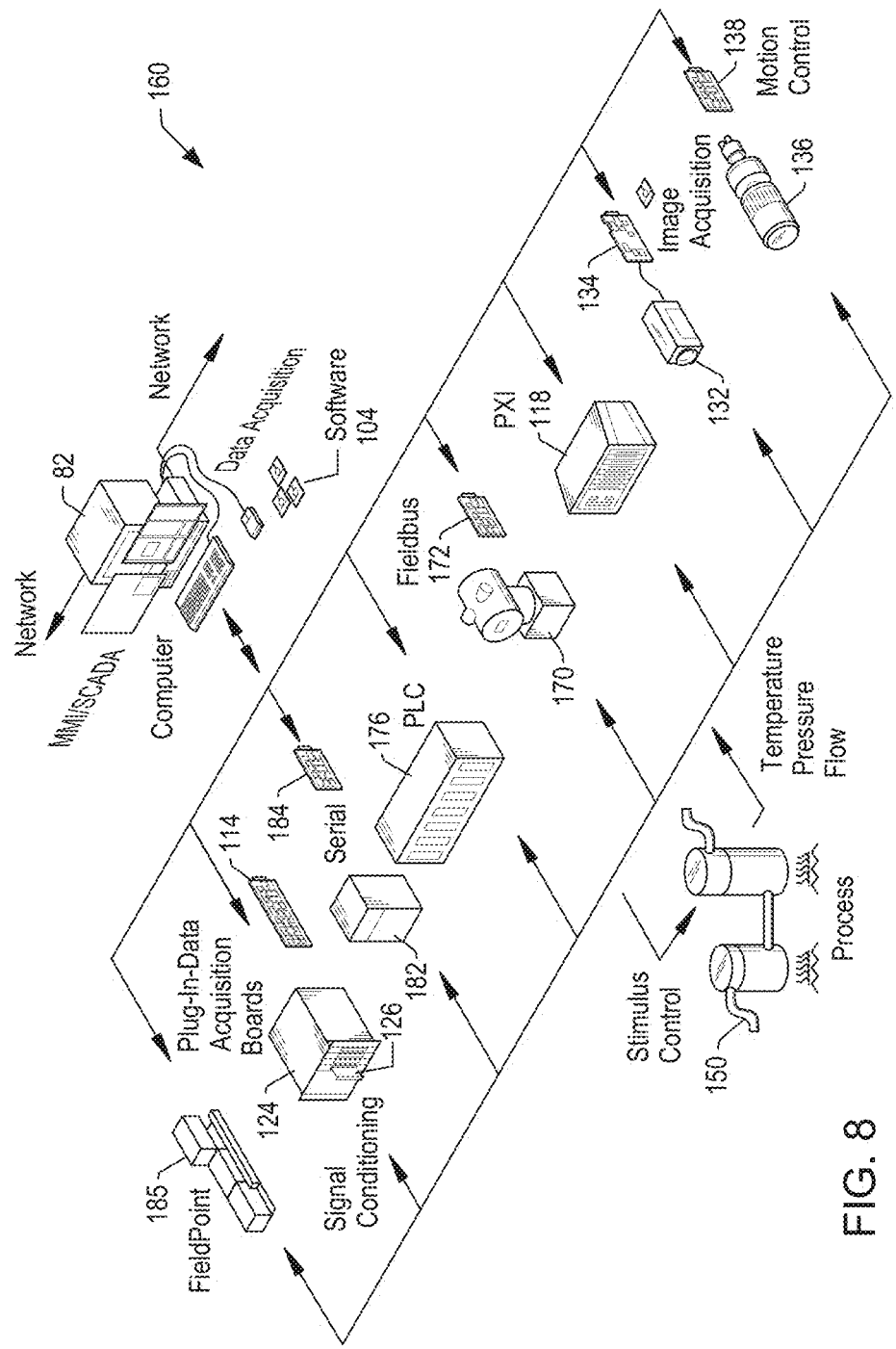
FIG. 8 illustrates an exemplary industrial automation system.

FIG. 8 illustrates an exemplary industrial automation system 160 which may implement embodiments of the invention. The industrial automation system 160 is similar to the instrumentation or test and measurement system 100 shown in FIG. 7. Elements which are similar or identical to elements in FIG. 7 have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others, e.g., via execution of software 104.

FIG. 8 illustrates an exemplary industrial automation system 160 which may implement embodiments of the invention. The industrial automation system 160 is similar to the instrumentation or test and measurement system 100 shown in FIG. 7. Elements which are similar or identical to elements in FIG. 7 have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system 185 available from National Instruments Corp., among other types of devices.

Figure 9:
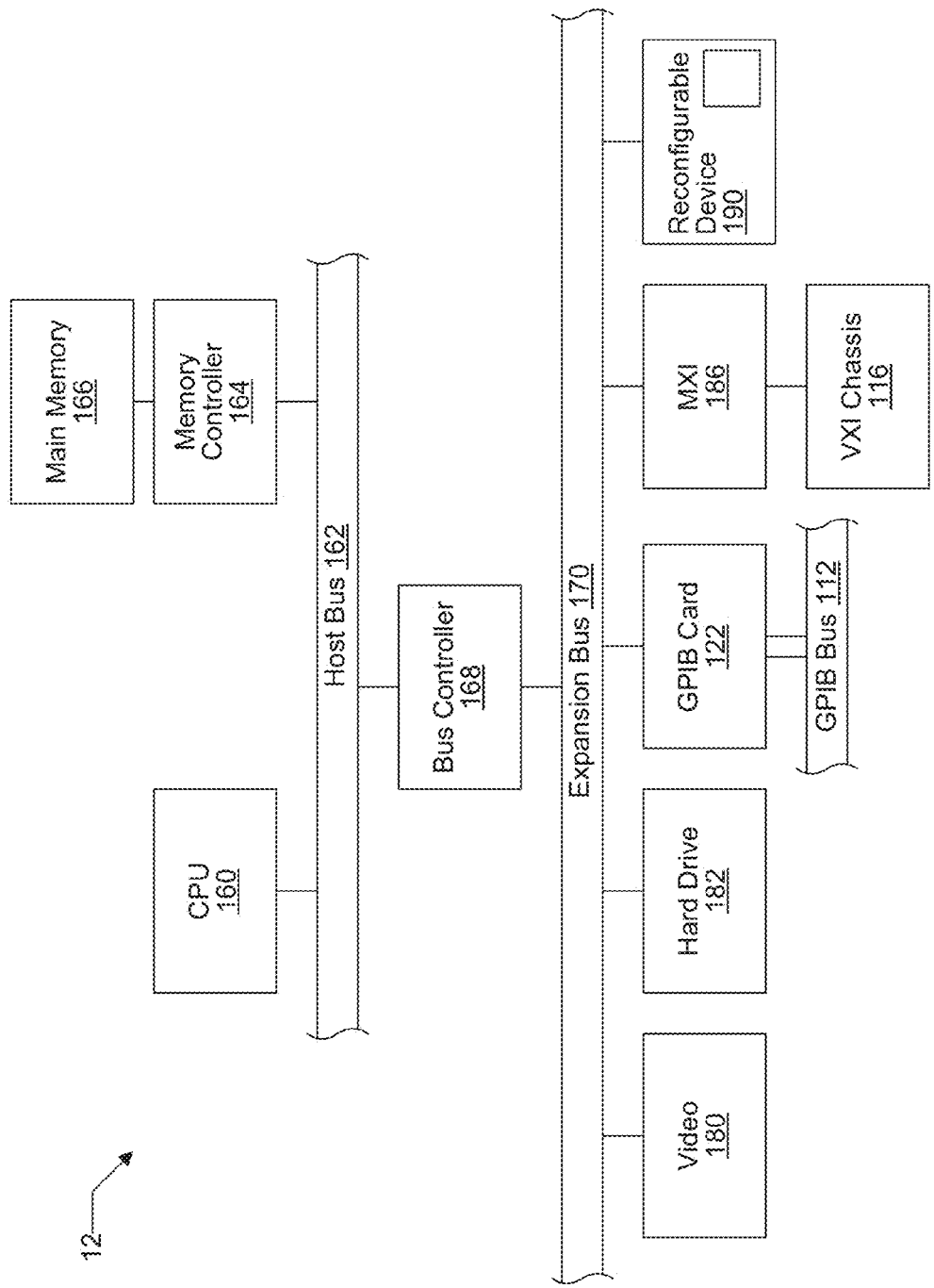
FIG. 9 is a block diagram illustrating details of a computer system according to some embodiments.

FIG. 9—Computer System Block Diagram

FIG. 9 is a block diagram representing one embodiment of the computer system 82 and/or 90 illustrated in FIGS. 5 and 6, or computer system 82 shown in FIG. 7 or 8. It is noted that any type of computer system configuration or architecture can be used as desired, and FIG. 9 illustrates a representative PC embodiment. It is also noted that the computer system 12 may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. One or more memory mediums, typically including RAM and referred to as main memory 166, may be coupled to the host bus 162 by means of a memory controller 164. The main memory 166 may store the graphical program 300, the producer program 302, the consumer program 304, and the graphical program execution environment 301. The main memory 166 may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer. In some embodiments the device 190 may include a processor and memory which may execute a real time operating system. The device 190 may also or instead comprise a programmable hardware element. In some embodiments the computer system may be configured to deploy the graphical program 300 to the device 190 for execution of the graphical program 300 on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

FIG. 10

Figure 10:
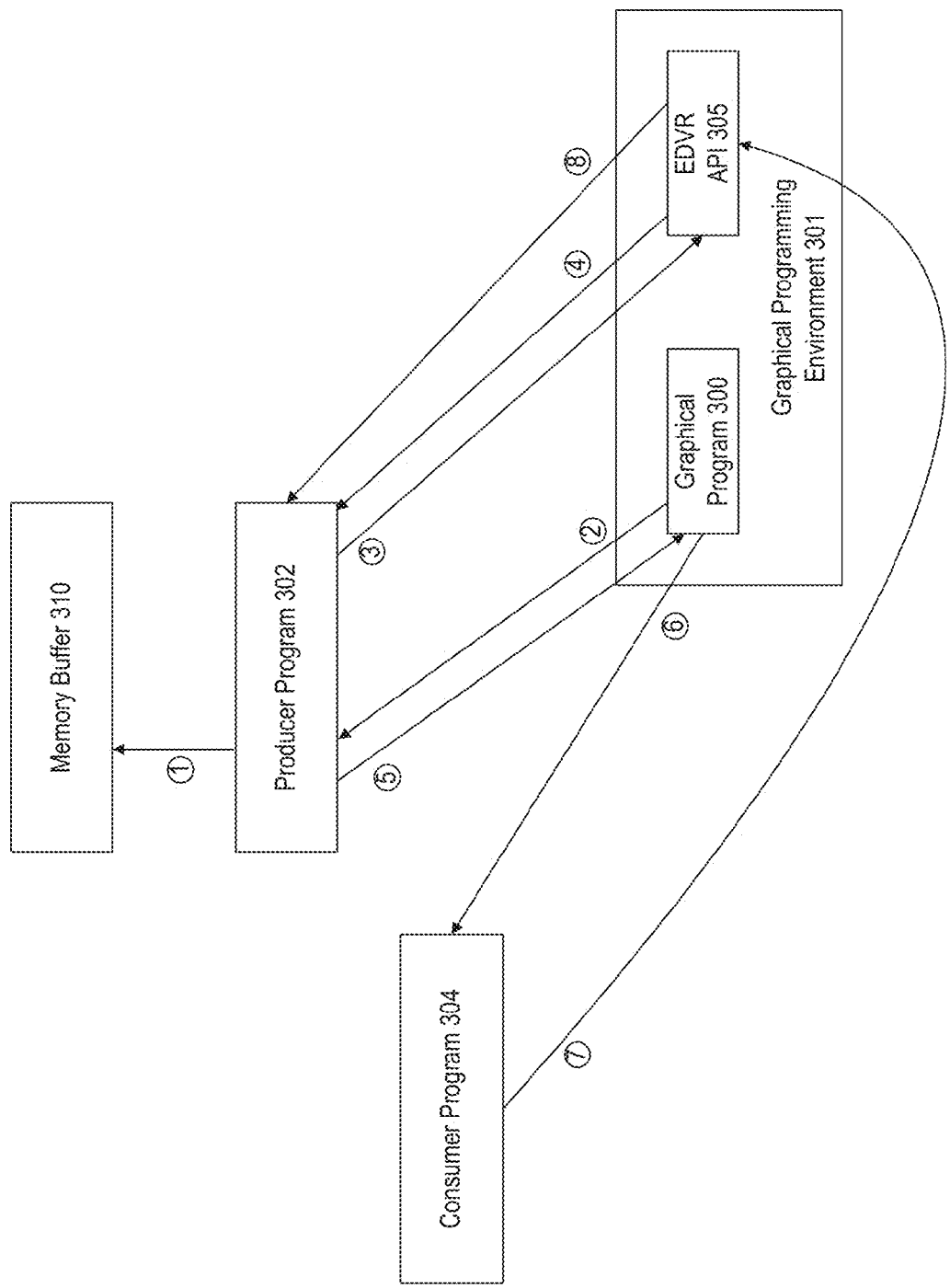
FIG. 10 is a diagram illustrating the interaction of a graphical program, a graphical programming environment, a producer program, and a consumer program according to some embodiments.

As mentioned above, in some embodiments the graphical program 300 may enable a consumer program 304 to use data produced by a producer program 302 without requiring a separate copy of the data to be made before the consumer program 304 can access the data. In various embodiments the graphical program 300, the graphical program execution environment 301, the producer program 302, and the consumer program 304 may interact with each other in various ways. FIG. 10 is a diagram illustrating their interaction with each other according to one embodiment.

As indicated by the arrow 1, the producer program may produce data and store the data in a memory buffer 310 (or may cause data produced by another software or hardware entity to be stored in the memory buffer 310). In some embodiments the memory buffer 310 may be a block of memory within a memory region allocated by the producer program, e.g., a region of memory from the main memory 166 of the computer system 82. For example, the region of memory may be allocated by the producer program from the operating system of the computer system 82 in response to a request by the producer program.

In various embodiments the producer program may be any kind of program and may produce and store any kind of data in the memory buffer 310. As one example, the producer program may be a device driver program that interacts with or controls a measurement device or instrument coupled to the computer system 82, as illustrated in FIGS. 7 and 8, such as the motion control interface device 138, image acquisition device 134, or other measurement device. In this example, the device driver program (producer program) may command the measurement device to transfer the measurement data to the memory buffer 310, e.g., using DMA techniques. As another example, the producer program may be associated with a technical data management framework that manages technical data, such as measurement data acquired from a measurement device. For example, the producer program may retrieve technical data from a database and store the technical data in the memory buffer 310.

The graphical program 300 may enable the consumer program 304 to use the data stored by the producer program 302 in the memory buffer 310 by passing an EDVR data structure that references the memory buffer 310 to the consumer program 304. In various embodiments the EDVR may be created in various ways. According to some embodiments, one or more of the nodes in the graphical program, referred to as reference creation node(s), may be executable to communicate with the producer program 302 to request the creation of the EDVR, as indicated by the arrow 2 in FIG. 10.

Although the memory buffer 310 is owned by the producer program 302, the EDVR that is used to reference the memory buffer 310 is a data structure that needs to be accessible by the graphical program 300. Since the producer program 302 is an external program from the graphical program 300 and the graphical program execution environment 301, the producer program 302 may not have the knowledge or ability to create the EDVR, which instead may need to be created internally to the graphical program execution environment 301. As shown in FIG. 10, the graphical program execution environment 301 may include an application programming interface (API) that includes functions for creating and managing external data value references, illustrated as the EDVR API 305. As indicated by the arrow 3, the producer program 302 may call the EDVR API 305 to request the EDVR data structure to be created. In response to this request, the graphical program execution environment 301 may create the EDVR and return it to the producer program 302, as indicated by the arrow 4.

When the producer program 302 receives the EDVR from the graphical program execution environment 301, the producer program 302 may then modify the EDVR to cause it to reference the memory buffer 310, e.g., by writing location information into the EDVR indicating where the buffer 310 (or a portion of the buffer 310) is stored in memory. The producer program 302 then returns the EDVR to the graphical program 300, as indicated by the arrow 5.

As indicated by the arrow 6, the graphical program 300 may then pass the EDVR to the consumer program 304. In some embodiments the consumer program 304 may be represented in the block diagram of the graphical program as one or more consumer program nodes to which the reference creation node is wired, where the wire visually indicates that the reference creation node is configured to pass the EDVR to the consumer program node(s). Thus, during the execution of the graphical program, the reference creation node may execute to communicate with the producer program to cause the EDVR to be created, and may then pass the EDVR along the wire to the consumer program node(s) that represent or encapsulate the consumer program 304.

The consumer program 304 may then use the EDVR to access the memory buffer 310. The EDVR enables the consumer program 304 to access the data directly from the memory buffer 310 in which the data was originally stored by the producer program 302 without requiring the data in the memory buffer 310 to first be copied to another memory location. The consumer program may use the data in the memory buffer 310 in any of various ways, depending on the particular application. As one example, the consumer program may cause the data from the memory buffer 310 to be written to a disk drive or other target storage device coupled to the computer system 82. The target storage device may be directly coupled to the computer system, e.g., via an I/O bus, or may be indirectly coupled to the computer system through a network. In some embodiments the consumer program may write the data into a data file according to a particular format. For example, in one embodiment the data may be measurement data acquired from a measurement device, and the data may be written according to a technical data format specialized for representing measurement data. As another example, the consumer program may write the data into one or more tables of a database. In other embodiments the consumer program may use the data in other ways instead of or in addition to writing the data to a target storage location. For example, the consumer program may analyze the data in various ways, and display or log results of the analysis. As another example, the consumer program may use the data to determine how to control a device or instrument coupled to the computer system, e.g., to provide feedback for a process control application based on the data.

After the consumer program 304 writes the data referenced by the EDVR to the target storage location or otherwise consumes the data referenced by the EDVR, the consumer program may call the EDVR API 305 of the graphical program execution environment 301 to notify the graphical program execution environment 301 that the consumer program is finished with the EDVR, as indicated by the arrow 7. The graphical program execution environment 301 may in turn communicate with the producer program 302 as indicated by the arrow 8 to notify the producer program that the EDVR is no longer in use, and thus the producer program 302 can now de-allocate or re-use the memory referenced by the EDVR. In some embodiments the producer program may register a callback function for the graphical program execution environment to call when the EDVR is no longer needed, and the graphical program execution environment may call the callback function.

In some embodiments, the producer program 302 may treat the memory buffer 310 as a circular FIFO (first-in, first-out) buffer. For example, the producer program 302 may periodically produce new data values and store them in the next unused portion of the memory buffer 310, wrapping back to the beginning of the buffer when the end is reached. In some embodiments, the EDVR returned to the graphical program 300 may be a reference to a particular section of the memory buffer 310, rather than referencing the entire memory buffer 310. For example, the graphical program 300 may periodically communicate with the producer program 302 to request a reference to the next "n" elements of the memory buffer 310, where n is a positive integer. Upon each request, the producer program may return an EDVR pointing to the next section of the memory buffer beyond the section that was last requested by the graphical program. Along with each EDVR, the producer program may also return information indicating the number of elements in the section pointed to by the EDVR, which may be the same as the number of elements requested by the graphical program, or may be less if the end of the memory buffer is reached or if the requested number of elements is not available in the time frame specified by the requestor. Thus, for example, suppose that the graphical program first requests the first 10 elements of the memory buffer. The producer program may communicate with the graphical program execution environment 301 to create a first EDVR data structure and may set the first EDVR to point to the beginning of the memory buffer, and then return the first EDVR to the graphical program along with information indicating that the first EDVR points to a section containing 10 elements of the memory buffer. The graphical program may later request the next 10 elements of the memory buffer. The producer program may then communicate with the graphical program execution environment 301 to create a second EDVR data structure and may set the second EDVR to point to the section of the memory buffer that starts at the 11th element, and may then return the second EDVR to the graphical program along with information indicating that the second EDVR points to a section containing 10 elements of the memory buffer. The graphical program may pass each respective EDVR to the consumer program to enable the consumer program to consume the data pointed to by the respective EDVR. When the consumer program has finished consuming the data pointed to by each respective EDVR, the consumer program may call the EDVR API 305 of the graphical program execution environment 301 to notify the graphical program execution environment 301 that the consumer program is finished with the EDVR. The graphical program execution environment 301 may in turn communicate with the producer program 302 to notify the producer program that the EDVR is no longer in use, and thus the producer program 302 can now re-use the section of memory referenced by the EDVR, e.g., can write new data into that section of the memory buffer 310.

In some embodiments the graphical program may pass the EDVR's to the consumer program asynchronously, e.g., without blocking or waiting for the consumer program to consume the data pointed to by each EDVR. Thus, for example, the producer program may execute a loop to produce respective data sets and store them in the memory buffer 310. The graphical program may execute a loop to request respective EDVRs referencing respective sections of the memory buffer 310 from the producer program and to asynchronously pass the EDVRs to the consumer program without blocking. Each time the consumer program receives a new EDVR from the graphical program, the consumer program may schedule an operation to consume the data (e.g., an operation to write the data to disk, for example), and may then immediately return control to the graphical program without waiting for the consumption operation to occur. The graphical program may thus loop back around and wait for the next data set to become available from the producer program. In the mean time, the consumer program may consume the data referenced by each EDVR and then asynchronously notify the graphical program execution environment (which in turn notifies the producer program) that the EDVR can be released.

Thus, various embodiments of the system and method described herein may enable a consumer program to share a memory buffer allocated by a producer program to asynchronously consume data produced by the producer program. Since the graphical program execution environment acts as an intermediary between the producer program and the consumer program, these two programs may not communicate directly, and may not even need to know about each other. Instead, the producer program and the consumer program can utilize the EDVR API 305 of the graphical program execution environment 301 to implement the memory buffer sharing, as described above.

In some embodiments the graphical program 300 and the graphical program execution environment 301 may act as an intermediate agent between the producer program and the consumer program, where the graphical program itself does not access the memory buffer that stores the data produced by the producer program. The graphical program may obtain the EDVR that references the memory buffer and pass the EDVR to the consumer program. The graphical program execution environment may then notify the producer program when the EDVR has been released by the consumer program in response to the consumer program asynchronously notifying the graphical program execution environment that it has released the EDVR.

In other embodiments the graphical program itself may access the memory buffer. For example, in addition to the consumer program reading the data from the memory buffer, the graphical program may also read the data and use it to perform various operations. The graphical program may also modify the data in the memory buffer in some embodiments. For example, in some embodiments, after creating the EDVR that references the memory buffer, the graphical program may use the EDVR to read the data from the memory buffer, process the data to produce modified data, and write the modified data to the memory buffer to replace the original data. The graphical program may then pass the EDVR to the consumer program, which may use the EDVR to access the modified data in the memory buffer.

Figure 11:
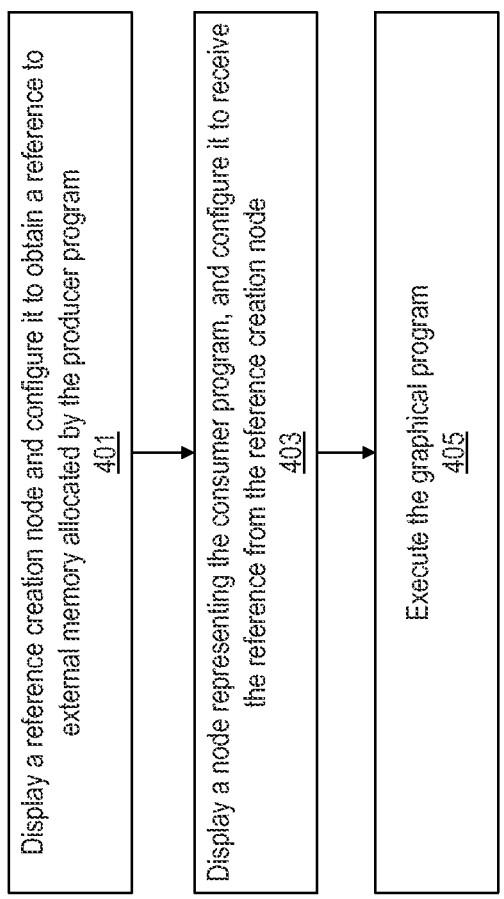
FIG. 11 is a flowchart diagram illustrating one embodiment of a method for creating a graphical program to implement an application in which a consumer program uses data produced by a producer program.

In some embodiments the graphical program execution environment 301 may provide function blocks or sub-program nodes which are pre-configured to act as producer programs and consumer programs which share a memory buffer with each other. The user may be able to select these nodes and include them in a graphical program to easily implement various applications. FIG. 11 is a flowchart diagram illustrating one embodiment of a method for creating a graphical program to implement an application in which a consumer program uses data produced by a producer program.

A user of the graphical program execution environment 301 may utilize a block diagram editor to create the graphical program by arranging on a display a plurality of nodes or icons and then interconnecting the nodes to create the graphical program. The nodes may be interconnected in one or more of a data flow, control flow, or execution flow format. The graphical program may thus comprise a plurality of interconnected nodes or icons that visually indicates the functionality of the program. As one example, the user may use the LabVIEW™ graphical programming development environment to create the graphical program.

Figure 12:
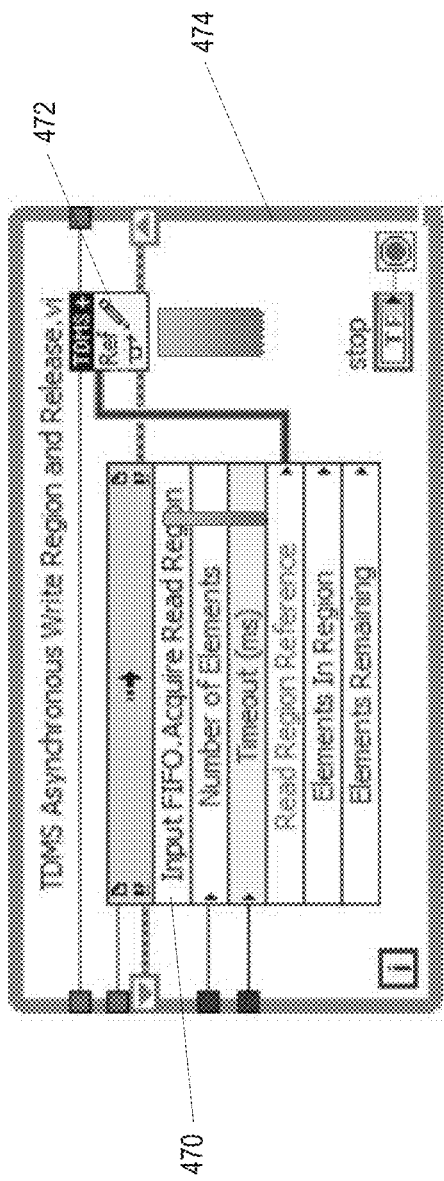
FIG. 12 illustrates an example of a graphical program created according to one embodiment of the method of FIG. 11.

As indicated in block 401, in creating the graphical program, the user may select a reference creation node and cause it to be displayed in the graphical program. The user may configure the reference creation node to obtain a reference to a section of external memory allocated by a producer program that operates externally from the graphical program and the graphical program execution environment. In some embodiments the reference creation node may be inherently associated with a particular producer program. In other embodiments the user may provide input to the graphical program execution environment selecting a particular producer program with which to associate the reference creation node. The user may also configure the reference creation node with other information, such as a number of memory elements to request. FIG. 12 illustrates one example of a graphical program including a reference creation node 470 configured to acquire an EDVR referencing an external block of memory. The user can wire inputs to the reference creation node 470 to specify a number of elements requested for the reference, and a timeout value indicating how long to wait for the producer program to return the reference before timing out. In the example of FIG. 12, the reference creation node 470 may be associated with an external device driver program that stores measurement data acquired by a measurement device in memory of a host computer system.

As indicated in block 403 of FIG. 11, the user may also display a node representing a consumer program, and configure the consumer program to receive the reference from the reference creation node. For example, in FIG. 12 the user has included the TDMS node 472 in the graphical program, which is a node provided by the graphical program execution environment with pre-configured functionality for receiving data and writing the data to disk in a technical data format. The user has also wired the reference creation node 470 to the TDMS node 472 to indicate that the EDVR reference obtained by the reference creation node 470 is passed as input to the TDMS node 472.

In some embodiments the node that receives the reference from the reference creation node may represent an external consumer program that executes externally from the graphical program and the graphical program execution environment. In other embodiments the consumer program may execute within the graphical program execution environment.

In response to the user assembling the graphical program, data structures may be created and stored which represent the graphical program. As indicated in block 405 of FIG. 11, the user may then request the graphical program to be executed. The graphical program may execute under control of the graphical program execution environment 301. During the execution, the reference creation node 470 may obtain a reference to a section of memory allocated by the producer program and may pass the reference to the consumer program node, e.g., the TDMS node in the example of FIG. 12. The TDMS node is pre-configured with functionality to asynchronously write the data in the referenced external memory section to disk and then call the EDVR API 305 of the graphical program execution environment 301 to release the external memory section. Thus, the user does not need to manually create program code to handle the details of releasing the memory since the TDMS node performs the memory release automatically. To create the application, the user simply displays and connects the nodes as shown in FIG. 12. The user may also display a loop structure 474 and position the reference creation node 470 and TDMS node 472 within the loop structure. This may cause the graphical program to perform a loop, where in each iteration of the loop the reference creation node obtains a reference to a respective section of external memory containing data produced by the producer program and passes the reference to the TDMS node. Thus, the TDMS node 472 may asynchronously stream the data produced by the producer program to disk.

In some embodiments the graphical program may not show a separate producer node that represents the producer program. Instead, the reference creation node may be inherently associated with a particular producer program. In other embodiments the graphical program may show a producer node and may connect it to the reference creation node to more explicitly show where the memory reference originates. In still other embodiments the graphical program may show a producer node that is wired directly to the consumer node without an intermediate reference creation node between. Wiring the producer node to the consumer node may configure the graphical program to pass a reference to external memory allocated by the producer program to the consumer program.

In various embodiments the graphical program execution environment may provide reference creation nodes or producer nodes for producing or obtaining references to various kinds of data created by any of various kinds of producer programs. Similarly, the graphical program execution environment may provide various consumer nodes that are operable to invoke any of various kinds of consumer programs that utilize data in any of various ways. The user may be able to pair up any of the various producer programs with any of the various consumer programs by creating a graphical program according to the techniques described above in order to easily create an application in which a given consumer program consumes data stored in external memory allocated by a given producer program.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method comprising:
executing a graphical program, a producer program, and a consumer program on a computer system, wherein the graphical program includes a plurality of nodes that visually indicate functionality of the graphical program, wherein the graphical program executes within a graphical program execution environment, wherein the producer program executes externally from the graphical program and the graphical program execution environment, and wherein the graphical program execution environment is one or more programs, including a graphical program execution engine;
wherein the graphical program executes via the graphical program execution engine to receive a reference to a block of memory allocated by the producer program externally from the graphical program and to pass the reference to the consumer program, wherein the block of memory is external to the graphical program and the graphical program execution environment, and wherein the reference enables at least one node of the plurality of nodes to natively access the block of memory;
wherein the consumer program executes to:
access data stored in the block of memory allocated by the producer program; and
after accessing the data, asynchronously notify the graphical program execution environment to cause the block of memory to be released;
wherein the graphical program execution environment executes to notify the producer program that the block of memory is no longer in use in response to the consumer program notifying the graphical program execution environment.

2. The method of claim 1,
wherein the producer program executes in an operating system process separate from the graphical program and the graphical program execution environment.

3. The method of claim 1,
wherein the consumer program executes externally from the graphical program and the graphical program execution environment.

4. The method of claim 1,
wherein the consumer program executes within the graphical program execution environment.

5. The method of claim 1,
wherein the producer program that allocates the block of memory is a device driver program for a hardware device coupled to the computer system.

6. The method of claim 1, further comprising:
displaying the graphical program on a display device of the computer system, wherein displaying the graphical program includes displaying a particular node that represents the consumer program.

7. The method of claim 6,
wherein the particular node is displayed in the graphical program in response to user input selecting the particular node for inclusion in the graphical program;
wherein the particular node includes functionality for performing said accessing the data stored in the block of memory and said asynchronously notifying the graphical program execution environment to cause the block of memory to be released.

8. The method of claim 6,
wherein displaying the graphical program further includes displaying a second node configured to receive the reference to the block of memory allocated by the producer program externally from the graphical program.

9. The method of claim 1,
wherein the reference to the block of memory is a first reference to a first block of memory;
wherein the graphical program further executes to receive a second reference to a second block of memory allocated by the producer program and to pass the second reference to the consumer program without waiting for the consumer program to access the data stored in the first block of memory.

10. The method of claim 1,
wherein the consumer program executes to access the data stored in the block of memory by asynchronously writing the data to a target storage device;
wherein after passing the reference to the block of memory to the consumer program, the graphical program continues execution without waiting for the data stored in the block of memory to be written to the target storage device.

11. The method of claim 1,
wherein the graphical program executes a loop, wherein during each iteration of the loop the graphical program receives a respective reference to a respective block of memory allocated by the producer program and passes the respective reference to the consumer program;
wherein in response to receiving each respective reference to each respective block of memory, the consumer program executes to asynchronously write data stored in the respective block of memory to a target storage device; and
wherein after passing each respective reference to each respective block of memory to the consumer program, the graphical program continues execution without waiting for the data stored in the respective block of memory to be written to the target storage device.

12. A method comprising:
displaying a first node in a graphical program, wherein the graphical program executes within a graphical program execution environment via a graphical program execution engine, wherein the first node is configured to receive a reference to a block of memory allocated by a producer program external to the graphical program and the graphical program execution environment, wherein the graphical program execution environment is one or more programs, including the graphical program execution engine, and wherein the block of memory is external to the graphical program and the graphical program execution environment;
connecting the first node to a second node representing a consumer program; and
executing the graphical program, wherein the first node executes to receive the reference and pass the reference to the consumer program, wherein the second node executes to invoke the consumer program, and wherein the reference enables at least one node of the graphical program to natively access the block of memory;
wherein the consumer program executes to:
receive the reference to the block of memory allocated by the producer program;
access data stored in the block of memory; and
cause the reference to the block of memory to be released.

13. The method of claim 12,
wherein the graphical program executes within a graphical program execution environment, wherein the graphical program execution environment comprises one or more programs, including a graphical program execution engine via which the graphical program executes;
wherein the consumer program executes to release the block of memory by communicating with the graphical program execution environment to inform the graphical program execution environment that the block of memory can be released, and wherein the graphical program execution environment communicates with the producer program to inform the producer program that the block of memory can be released.

14. A computer-readable memory medium storing program instructions, wherein the program instructions include:
program instructions of a graphical program execution environment, wherein the graphical program execution environment is one or more programs, including a graphical program execution engine;
program instructions of a graphical program executable within the graphical program execution environment via the graphical program execution engine, wherein the graphical program includes a plurality of nodes that visually indicate the functionality of the graphical program;
program instructions of a producer program executable externally from the graphical program and the graphical program execution environment; and
program instructions of a consumer program;
wherein the program instructions of the graphical program are executable to receive a reference to a block of memory allocated by the producer program externally from the graphical program and to pass the reference to the consumer program, wherein the block of memory is external to the graphical program and the graphical program execution environment, and wherein the reference enables at least one node of the plurality of nodes to natively access the block of memory;
wherein the program instructions of the consumer program are executable to:
access data stored in the block of memory allocated by the producer program; and
after accessing the data, asynchronously notify the graphical program execution environment to cause the block of memory to be released;
wherein the program instructions of the graphical program execution environment are executable to notify the producer program that the block of memory is no longer in use in response to the consumer program notifying the graphical program execution environment.

15. The computer-readable memory medium of claim 14, wherein the producer program is a device driver program for a hardware device.

16. The computer-readable memory medium of claim 14, wherein the program instructions of the consumer program are executable to access the data stored in the block of memory by asynchronously writing the data to a target storage device.

17. A system comprising:
one or more processors; and
memory storing program instructions, wherein the program instructions include:
program instructions of a graphical program execution environment, wherein the graphical program execution environment is one or more programs, including a graphical program execution engine;
program instructions of a graphical program executable within the graphical program execution environment via the graphical program execution engine, wherein the graphical program includes a plurality of nodes that visually indicate the functionality of the graphical program;
program instructions of a producer program executable externally from the graphical program and the graphical program execution environment; and
program instructions of a consumer program;
wherein the program instructions of the graphical program are executable to receive a reference to a block of memory allocated by the producer program externally from the graphical program and to pass the reference to the consumer program, wherein the block of memory is external to the graphical program and the graphical program execution environment, and wherein the reference enables at least one node of the plurality of nodes to natively access the block of memory;

wherein the program instructions of the consumer program are executable to:
- access data stored in the block of memory allocated by the producer program; and
- after accessing the data, asynchronously notify the graphical program execution environment to cause the block of memory to be released;

wherein the program instructions of the graphical program execution environment are executable to notify the producer program that the block of memory is no longer in use in response to the consumer program notifying the graphical program execution environment.

18. The system of claim 17,
wherein the producer program is a device driver program for a hardware device.

19. The system of claim 17,
wherein the program instructions of the consumer program are executable to access the data stored in the block of memory by asynchronously writing the data to a target storage device.

* * * * *